Nov. 18, 1941.  J. A. GITS  2,263,037
METHOD OF AND DIE FOR MOLDING PICTURE FRAMES
Filed Jan. 31, 1940  2 Sheets-Sheet 1
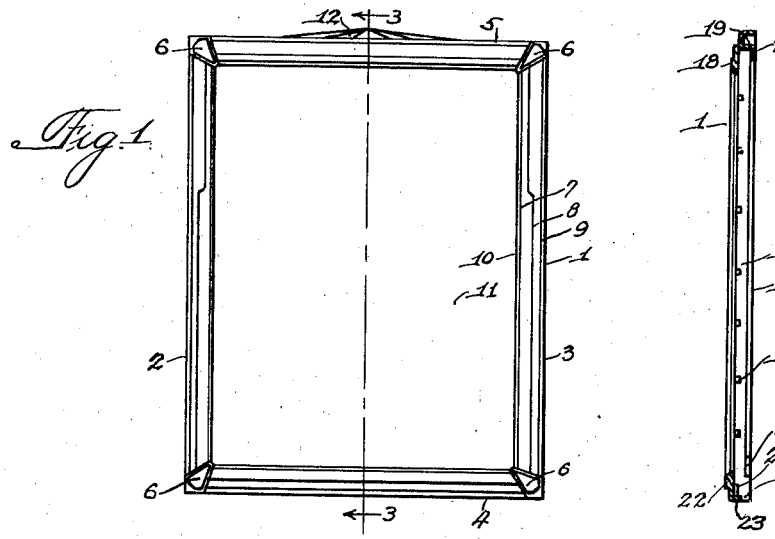
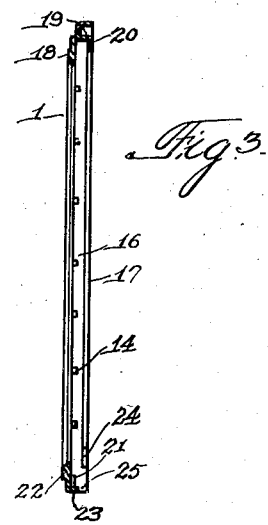
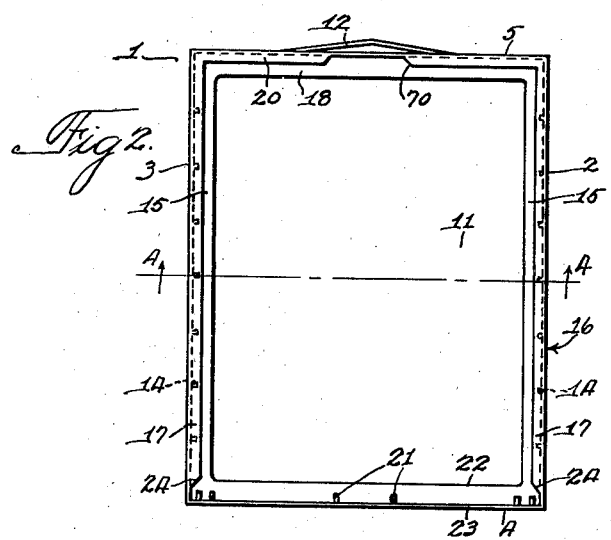
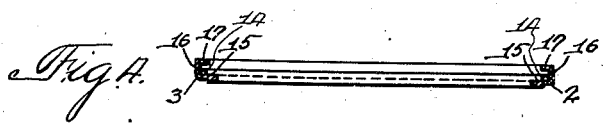
Inventor
Joseph A. Gits
By Anns, Phiers, Olsen & Mecklenburger
Attys.

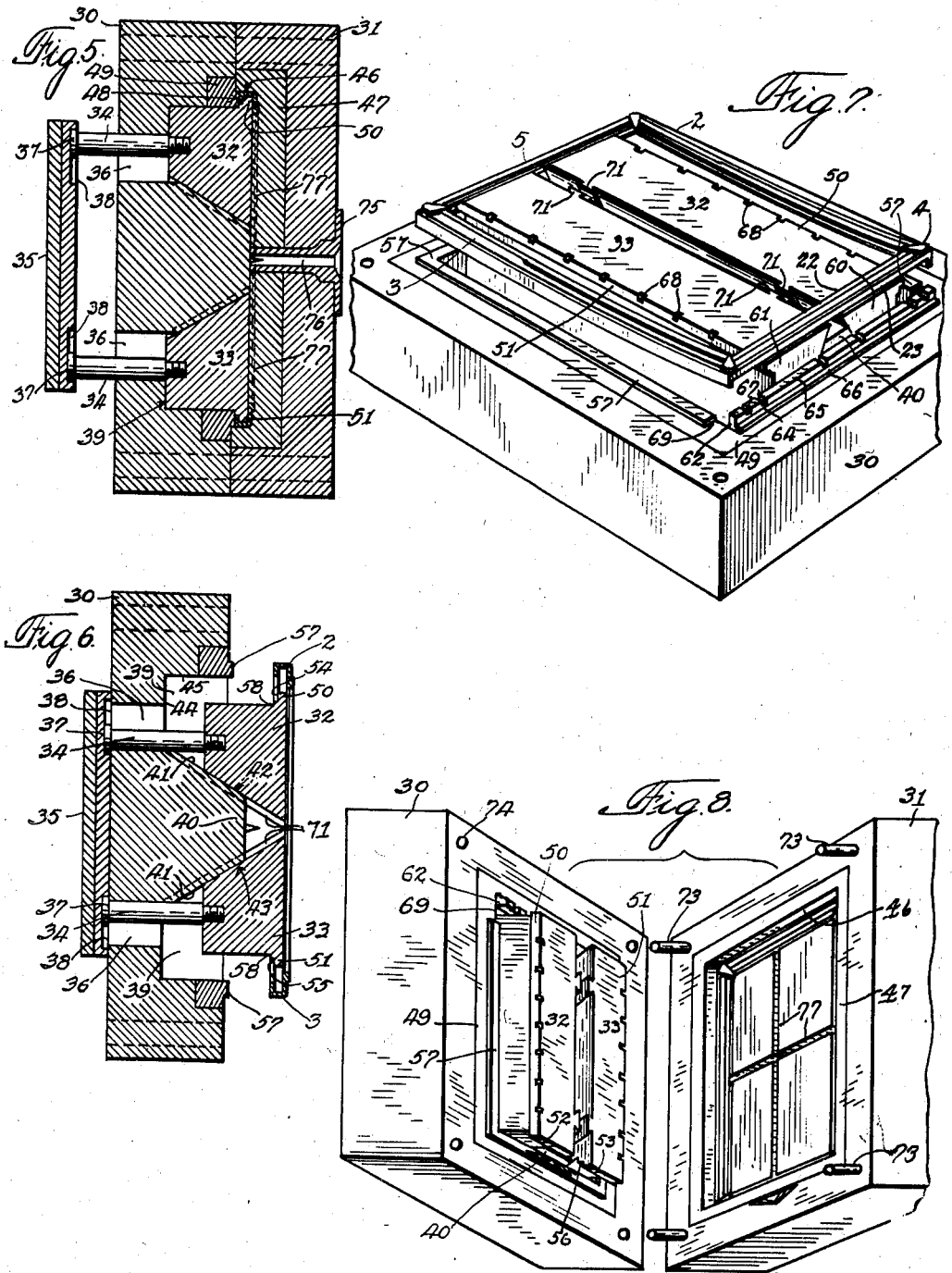

Patented Nov. 18, 1941

2,263,037

UNITED STATES PATENT OFFICE 2,263,037

METHOD OF AND DIE FOR MOLDING PICTURE FRAMES

Joseph A. Gits, Chicago, Ill., assignor to Gits Molding Corporation, Chicago, Ill., a corporation of Illinois Application January 31, 1940, Serial No. 316,521

9 Claims. (Cl. 18—42)

This invention relates to a method of and a die for molding articles of an intricate nature having undercut portions which could not be made heretofore by molding.

Methods previously used as well as the design of dies employed restricted the type and construction of articles that could be produced. Articles having a series of undercuts or intricate reentrant portions could not be molded because no provision was made successfully to remove the articles from the dies. It seemed that an article of the character of a picture frame, for example, having undercut flanges about a number of sides to carry and retain the glass and photographic print could not be made by a simple molding operation, and, at best, could only be made in parts and thereafter welded or fused together at the corners.

An object of the invention is to provide a new type of die and to a new and improved method of molding to be used in connection therewith whereby after the injection of the molding material into the impression or mold chamber, the die parts may be separated in a simple and effective manner to release or free the article to be produced without experiencing difficulty in releasing undercut portions, thereby making possible the molding of many types and kinds of articles as well as many articles that could not otherwise be made.

A further object of the invention is to provide a die or mold, and a method of molding in connection therewith, which includes providing an impression or mold chamber having walls representing an exact reproduction of the inner and outer surfaces of the article to be produced and arranging for a separation of these walls to free the article, first, by moving apart the walls that represent and form the outer surfaces of the article, second, by moving together the walls of the chamber that represent and form the inner surfaces of the article, and third, by flexing the article slightly at one end to lift the same at this end free of the chamber wall so that the article may then be moved forwardly to free its opposite end from the adjoining chamber wall. Accordingly, the invention provides apparatus for and a method of molding articles of intricate outlines and shapes wherein numerous undercut portions may be provided on the articles and the articles may be successfully molded by a simple and inexpensive operation and readily removed from the die.

The invention is particularly directed to molding various types of articles, and, as an example, reference may be made specifically to picture frames of different shapes and particularly to picture frames of rectangular shape, as shown in the drawings, and to molding these various types of articles out of a slightly flexible material that may be bent slightly without taking a permanent set, such as a thermo-plastic material capable of springing back to normal shape upon being released from its strained position whereby the article to be produced may be flexed slightly at one end in order to remove it from the die.

Other objects and advantages of the invention will be apparent from the following detail description taken in connection with the accompanying drawings.

In the drawings:

Figure 1 illustrates a picture frame as one type of article made by a die and a molding method embodying the present invention;

Fig. 2 is a rear view of this picture frame;

Fig. 3 is a vertical section taken along line 3—3 in Fig. 1;

Fig. 4 is a transverse section taken along line 4—4 in Fig. 2;

Fig. 5 is a sectional view of the die with its parts in closed position after an injection operation;

Fig. 6 is a similar sectional view but omitting one of the die blocks to illustrate die members moving away from the die block carrying the same, these die members moving toward each other to release the article produced along two opposed sides;

Fig. 7 illustrates in perspective the parts shown in Fig. 6 with one end of the article slightly flexed to lift it above the adjoining edge of the die members so that the opposite end of the article may be freed by moving the article in the direction of said opposite end; and Fig. 8 illustrates in perspective the manner in which the die blocks are separated and the die members moved outwardly, as explained above.

Although a picture frame of rectangular shape is specifically illustrated herein as an example of the article to be produced by the die construction and method disclosed herein, it will be understood that various other types of articles are contemplated as being within the scope of the invention.

It will be observed in the drawings that this picture frame designated 1 comprises opposite vertical sides 2 and 3 and opposite end sides 4 and 5. Frame 1 is designed with a plurality of raised facets 6 at the corners and a front rectangular face that is stepped, as indicated at 7, 8 and 9, and tapered inwardly slightly about the edge of its central opening 11. A stepped ornamental decoration 12 may be provided along the top end 5.

To accommodate a glass plate, a photographic print and a backing which are customarily used in picture frames so that the photographic print will be held between the glass plate and the backing, frame 1 is formed with an undercut portion about three sides, namely, 2, 3 and 5, the fourth or bottom side 4 having the undercut omitted whereby these parts may be readily inserted in the frame from bottom side 4. By referring to Figs. 1 to 4, inclusive, it will be observed that the plurality of spacing studs 14 may be formed along the inside corners between front wall 15, side walls 16 and return wall 17 of both vertical sides 2 and 3. Similar studs 21 are provided along the inside corner of front wall 22 of lower end 4 and a wall 23 that is formed perpendicular to wall 22. By omitting such spacing studs from along the inside corner of wall 18 and wall 19 of top end 5, an accurate fit of the glass plate is not necessary as long as it extends beyond the top of central opening 11 and rests against the inside surface of wall 18. Walls 15, 16 and 17 of each vertical side 2 and 3 and walls 18, 19 and 20 of top end 5 form undercut portions or flanges about three sides of this rectangular frame 1, while the bottom end or fourth side 4 is furnished with perpendicular flange 23 only. The lower portion of each wall 17 is cut away at 24 slightly above perpendicular flange 23 to allow the glass plate, photographic print and backing to be easily slid into position, it being noted that flange 23 of bottom end 4 is cut short of walls 17, as indicated at 25 in Fig. 3, to facilitate its ready insertion of these parts. In this connection, I believe that I am the first to provide a unitary frame of the type shown having the parts arranged in a manner described to accommodate the glass frame, photographic print and backing so as not to require extra parts to hold the same in position, and also I believe that I am the first to furnish the frame formed in this manner in a single operation that is simple and inexpensively performed.

One form of die construction that may be employed is shown in Figs. 5 to 8, inclusive. This die construction includes a pair of die blocks 30 and 31, a pair of die members 32 and 33, knockout bolts 34 carrying the die members 32 and 33, and a knock-out plate 35 having elongated slots 38 in which the heads 37 of bolts 34 are adapted to ride. Die block 30 is formed with elongated openings 36 for pins 34. As pins 34 move forward in elongated slots 36, heads 37 slide inwardly in slots 38. Die block 30 is also cut-a-way, as indicated at 39, on opposite sides of its central portion 40 whereby beveled faces 41 are formed along this central portion 40 to receive correspondingly formed beveled faces 42 and 43 on die members 32 and 33, respectively. Cut-a-way portions 39 are formed with perpendicular walls 44 and 45 to receive correspondingly formed walls on die members 32 and 33 whereby the latter will snugly seat in the cut-a-way portions 39 when in closed position, as shown in Fig. 5. Beveled walls 41, 42 and 43 provide, however, means for moving die members 32 and 33 together when die blocks 30 and 31 are separated and die members 32 and 33 are extended outwardly from die block 30, as shown in Fig. 8.

The impression or mold chamber between die blocks 30 and 31 is formed by a wall 46 on a cavity retaining member 47 seated in die block 31 and by a wall 48 on a cavity retaining member 49 seated in die block 30.

Die members 32 and 33 extend into the impression or mold chamber. A flange 50 and a flange 51 are provided along the outside edges of die members 32 and 33 to lie in the mold chamber and form a wall thereof, as illustrated in Fig. 5. Along one end of die members 32 and 33, similar flanges 52 and 53 are formed likewise to extend into the mold chamber and form a wall thereof. Flanges 50 and 51 are provided with an undercut, as indicated at 54 and 55, to form in the molding operation return flanges or sides 17 along vertical sides 2 and 3 of frame 1. A similar undercut 56 is formed on flanges 52 and 53 to provide return flange or side 20 along the top end 5 of frame 1. Although Fig. 8 shows only the undercut 56 on flange 53 of die member 33, it will be understood that a similar undercut 56 is also formed along flange 52 of die member 32. Three sides of cavity retaining member 49 are provided with a raised portion 57 cooperating with a shoulder 58 provided by undercuts 54, 55 and 56, so that the thickness and width of return flanges 17 and 20 may be determined by the extent of these undercuts and the size of shoulders 58 resting upon raised portions 57.

Walls 46 and 48 of cavity retaining members 47 and 49 are an exact reproduction of the outside surfaces of the article to be produced, while the walls of flanges 50, 51, 52 and 53, together with the opposite end portions of die members 32 and 33 that are not provided with such flanges but project into the mold chamber, represent and form the inside surface of the article to be produced. Central portion 40 of die block 30 also extends at each of its ends into the mold chamber between die members 32 and 33. These opposite ends of central portion 40 are not furnished with undercut flanges. Their walls are smooth as shown in Figs. 7 and 8. In connection with the end that forms bottom 4 of frame 1, attention is directed to Fig. 7 illustrating die members 32 and 33 with straight walls 60 and 61, respectively. This end of die block 30 has an upstanding or raised member 62 formed upon cavity retaining member 49. Member 62 is in the form of a stepped strip extending along the entire side of this end. The stepped formation is the result of a cut-away portion indicated at 64 in Fig. 7 that forms a verticle flange 65 and a horizontal flange 66. When die blocks 30 and 31 are closed, cavity retaining member 47 will seat against cavity retaining member 49 between the edge of flange 66 and the outer extremities of these members. In this manner, bottom end of frame 1 is formed with transverse flange 23 instead of an undercut as found on the other three sides. The outer edge of flange 65 is provided with a number of indentations 67 that correspond in shape to spacing lugs 21. In the molding operation, these indentations form these spacing lugs 21 integral with wall 22 and flange 23. Spacing lugs 14 along vertical sides 2 and 3 of frame 1 are formed by similar indentations 68 cut along the outside edges of die members 32 and 33. The cut-a-way portion 24 at the lower end of each wall 17 is the result of providing a space 69 on each side between the end of raised portion 57 and the end of member 62, as illustrated in Fig. 7.

It will be observed that the upper edge of central portion 40 at the end forming bottom 4 of frame 1 is substantially continuous with walls 60 and 61 of die members 32 and 33, and, in fact, forms a part of these walls when die members 32 and 33 are seated in cut-a-way portions 39, as shown in Fig. 5. Consequently, flange 23 is of the same formation throughout. At the opposite end of central portion 40 of die block 30, a similar straight wall is provided which will provide a cut 70 in side 20, as shown in Fig. 2.

It will be also observed that die blocks 32 and 33 are formed with dove-tailed keys 71 along their inside edges which are adapted to ride in keyways formed along the beveled surfaces 41 of central portion 40. Pins 73 carried at the corners of die block 31 cooperate with openings 74 in die block 30 so that when these die blocks are closed the walls of the mold chamber carried by the cavity retaining member 47 will align with the walls of the mold chamber carried by cavity retaining member 49 and die members 32 and 33. The usual injection nipple 75 may be carried upon die block 31 and have the usual central passage 76 feeding to the plurality of passages 77 communicating with the impression or mold chamber.

When the parts are assembled, as shown in Fig. 5, and a charge of molding material is injected in the impression or mold chamber, die blocks 30 and 31 are moved apart and knock-out plate 35 is actuated to move die members 32 and 33 together and away from die block 30. Separating die block 31 from die block 30 simultaneously with movement of die members 32 and 33 will leave the article to be formed upon the flanges 50, 51, 52 and 53. In other words, the article to be formed will be upon die members 32 and 33. These members are then contracted, preferably in the same movement, so as to withdraw flanges 50 and 51 from vertical sides 2 and 3 of the frame 1. This is illustrated in Fig. 6. The frame is then released from the die members 32 and 33 at opposite ends by being flexed or bent slightly, as illustrated in Fig. 7, along bottom edge 4 so as to lift flange 23 above walls 60 and 61 of die members 32 and 33. The distance that flange 23 must be lifted is slight with respect to the ability of the material to flex without assuming a permanent set when released from its strained position. With flange 23 above walls 60 and 61, frame 1 may be moved in the opposite direction in order to release flanges 52 and 53 on die members 32 and 33 from top 5 thereof, thereby freeing frame 1 and removing it from the die.

From the foregoing description it will be apparent that it is possible to provide an undercut about three sides of an article to be molded and a transverse flange at the fourth side without experiencing difficulty in removing the article from the die. Die members 32 and 33 move with respect to each other to release the article along two sides, while one end of the article is formed so that it may be lifted free of the die parts by slight flexing of the material in order to release this article at its opposite end. It will be apparent that the arrangement of these die parts, with respect to their construction and movement, permits a wide variation of the shape and design to be given to the article to be produced. The outside surface of the article is controlled by the shape of walls 46 and 48 of cavity retaining members 47 and 49. The inside surface of the article to be produced may be readily changed by changing the contour or shape of that part of die members 32 and 33 which extends into the impression or mold chamber. Accordingly, I do not desire to be limited to any particular shape of article that can be or may be produced by the mold disclosed herein. The feature of providing two die members between two die blocks, which die members are movable along a beveled surface to move away from the die member carrying the same and also move relative to each other, permits various features to be obtained with respect to molding articles of thermo-plastic material or like flexible material, and particularly permits undercut flanges to be formed in the manner disclosed herein.

Without further elaboration, the foregoing will so fully explain the gist of my invention that others may, by applying current knowledge, readily adopt the same for use under varying conditions of service, without eliminating certain features, which may properly be said to constitute the essential items of novelty involved, which items are intended to be defined and secured to me by the following claims.

I claim:

1. A die construction of the type described comprising at least two die blocks forming therebetween a rectangular impression or mold chamber, a plurality of die members carried by one of said die blocks and movable relative to each other and also movable away from said one die block when said die blocks are opened, said die members collectively forming a molding element of rectangular configuration extending into said mold chamber, said element being provided with a flange about all but one of their sides to form an undercut on all but one of the corresponding sides of the article of rectangular configuration to be produced, and means to move said die members toward each other upon being moved outwardly when said die blocks are separated whereby to release or free the undercut sides of the article to be produced from said flanges on said die members.

2. A die construction of the type described comprising at least two die blocks forming therebetween a substantially rectangular impression or mold chamber, a plurality of die members disposed between said die blocks and movable away from the same when said die blocks are opened, said die members extending into said mold chamber to provide an undercut about three adjacent sides of the article of rectangular configuration to be produced, and means to move said die members laterally toward each other upon being moved away from said die blocks when said die blocks are separated whereby to release the undercut sides of the article produced from said die members.

3. A die construction of the type described comprising at least two die blocks forming therebetween a substantially rectangular impression or mold chamber, a plurality of die members disposed between said die blocks and movable away from the same when said die blocks are opened, said die members extending into said mold chamber and provided with a projection about three of their sides to form an undercut about three sides of the article of rectangular configuration to be produced, there being beveled surfaces on one of said die blocks and cooperating beveled surfaces on said die members, and means to move said die members relative to each other and away from said one die block when said die blocks are opened whereby to release said projections of said die members from the undercut sides formed on said product.

4. A die construction of the type described comprising at least two die blocks forming therebetween a rectangular impression or mold chamber, a plurality of die members disposed between said die blocks, said die members collectively forming a mold element, said element having an overhanging flange upon three sides and a straight wall on the fourth side, said flanges and straight wall disposed within said mold chamber to form an undercut flange on three sides and a straight flange on the fourth side of a rectangular article to be produced, said die members carrying said rectangular article about its said overhanging flanges and straight wall, and means for mounting and moving said die members relative to said die blocks and relative to each other to release said article from said die members when said die blocks are separated.

5. In a die for molding a frame of rectangular configuration, a plurality of die blocks and a plurality of die members disposed between said die blocks when said die blocks are closed forming therebetween a substantially rectangular impression or mold chamber, the walls of said chamber including a projecting flange on said die members about a portion thereof and a perpendicular wall about the remaining portion thereof, beveled surfaces on one of said die blocks and on said die members, and means for supporting and moving said die members along said beveled surfaces when said die blocks are separated to extend said die members laterally toward each other from one of said die blocks whereby to release said die members from the rectangular frame to be produced so as to permit removal of the rectangular frame from said die members.

6. In a die for molding a frame of rectangular configuration, a plurality of die blocks and a plurality of die members disposed between said die blocks when said die blocks are closed forming therebetween a substantially rectangular impression or mold chamber, the walls of said chamber including a portion on said die members projecting into said chamber having a flange and a perpendicular wall thereon, means for supporting said die members on one of said die blocks, and means for moving said die members outwardly from said last die block but laterally toward each other when said die blocks are separated whereby to release said die members from the rectangular frame to be produced and permit removal of the rectangular frame from said die members.

7. In a picture frame molding die, a plurality of die blocks forming therebetween a substantially rectangular impression or mold chamber, at least two spaced die members disposed between said die blocks when they are closed, said die members protruding into said chamber and having walls that form a portion of the walls of said chamber, said protruding die member walls being an exact reproduction of the inner surfaces of the picture frame to be produced also of rectangular configuration and including a projection about three sides and a straight wall about the fourth side of said die member walls whereby the picture frame will have an undercut flange about three sides and a vertical flange about the fourth side, and means for moving said die members away from said die blocks when they are separated, said means including means for moving said die members toward each other whereby said projections on opposite side walls of said die members will be first withdrawn from corresponding undercut flanges on the picture frame produced and this picture frame thereafter removed from said die members by being lifted at the end having the vertical flange above the straight wall of said die members and move forwardly to free the same from the projection at the opposite end of said die members.

8. The method of molding a substantially rectangular frame having an undercut flange about a number of sides thereof and a vertical flange about one of its sides which comprises forming an impression or molding chamber having walls representing an exact reproduction of the inner and outer surfaces of the frame, injecting a molding material in said chamber, thereafter separating the walls of said chamber by first separating the walls thereof that represent and form the outer surfaces of the frame, then moving together in the direction of one dimension of the frame the walls of said chamber that represent and form the inner surfaces of the frame, and finally flexing the frame at the end having the vertical flange to lift said vertical flange above the corresponding end of said chamber walls representing and forming said inner surfaces and moving the frame forwardly to release it at the opposite end of said last chamber walls.

9. The method of molding a substantially rectangular frame having an undercut flange about three sides thereof and a vertical flange about the fourth side which comprises forming an impression or mold chamber of substantially rectangular configuration having walls representing an exact reproduction of the inner and outer surfaces of the frame, the walls of the chamber forming the inner surfaces being contractible, injecting a molding material in said chamber, thereafter separating the walls of said chamber to free said frame by first removing said walls thereof that represent and form the outer surfaces of the frame, then contracting the walls of said chamber that represent and form the inner surfaces of the frame whereby two of said three walls of said chamber are first released and freed from the undercut flanges formed along two opposing sides of the frame, then lifting the side of the picture frame having the vertical flange until said vertical flange is above the inner chamber wall forming this said vertical flange, and moving the frame endwise in opposite direction to free the undercut flange at the opposite end of the frame.

JOSEPH A. GITS.